July 24, 1923.
P. MUELLER
1,462,718
MULTIPLE METER TESTER APPARATUS
Filed Jan. 28, 1920    3 Sheets-Sheet 1
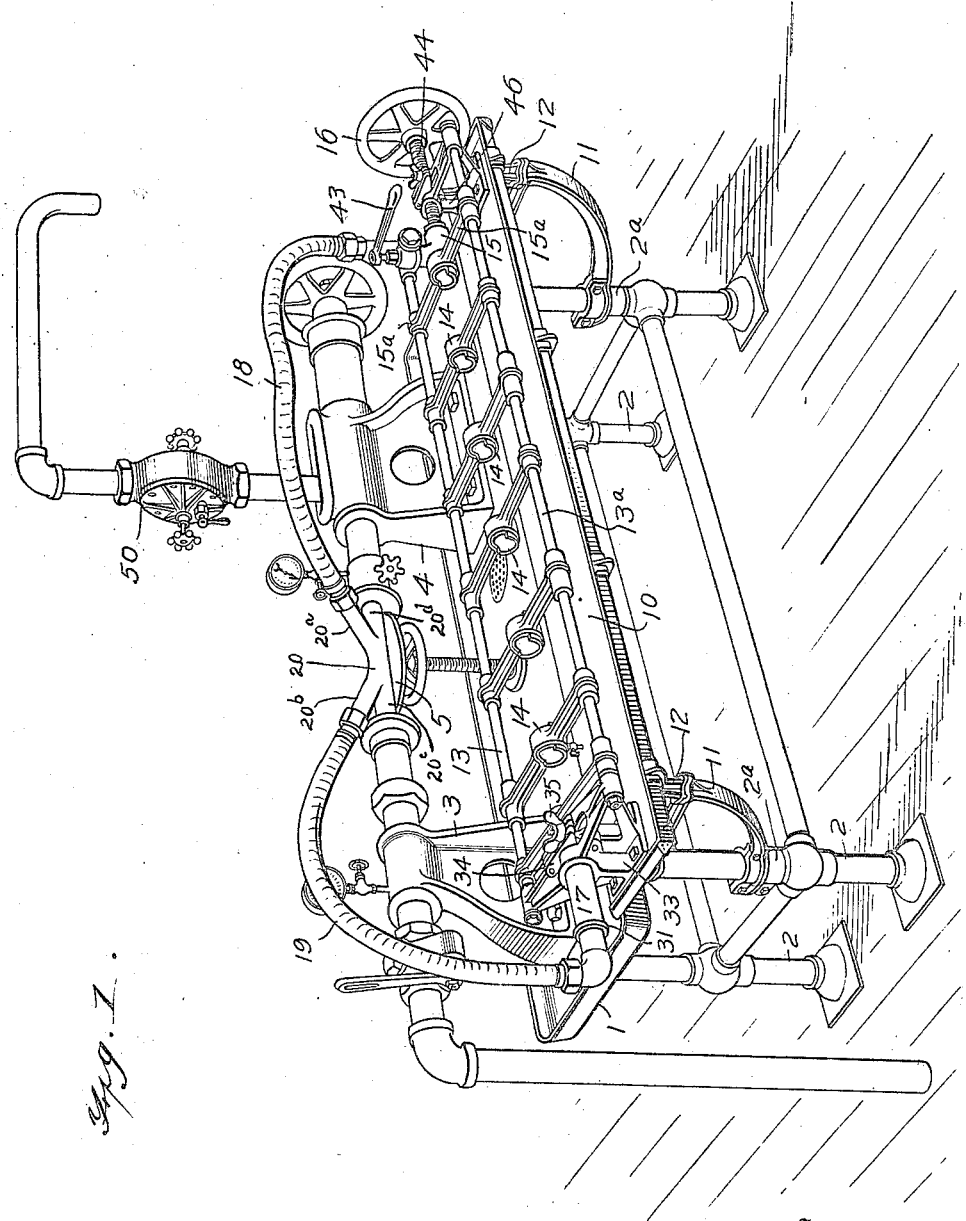

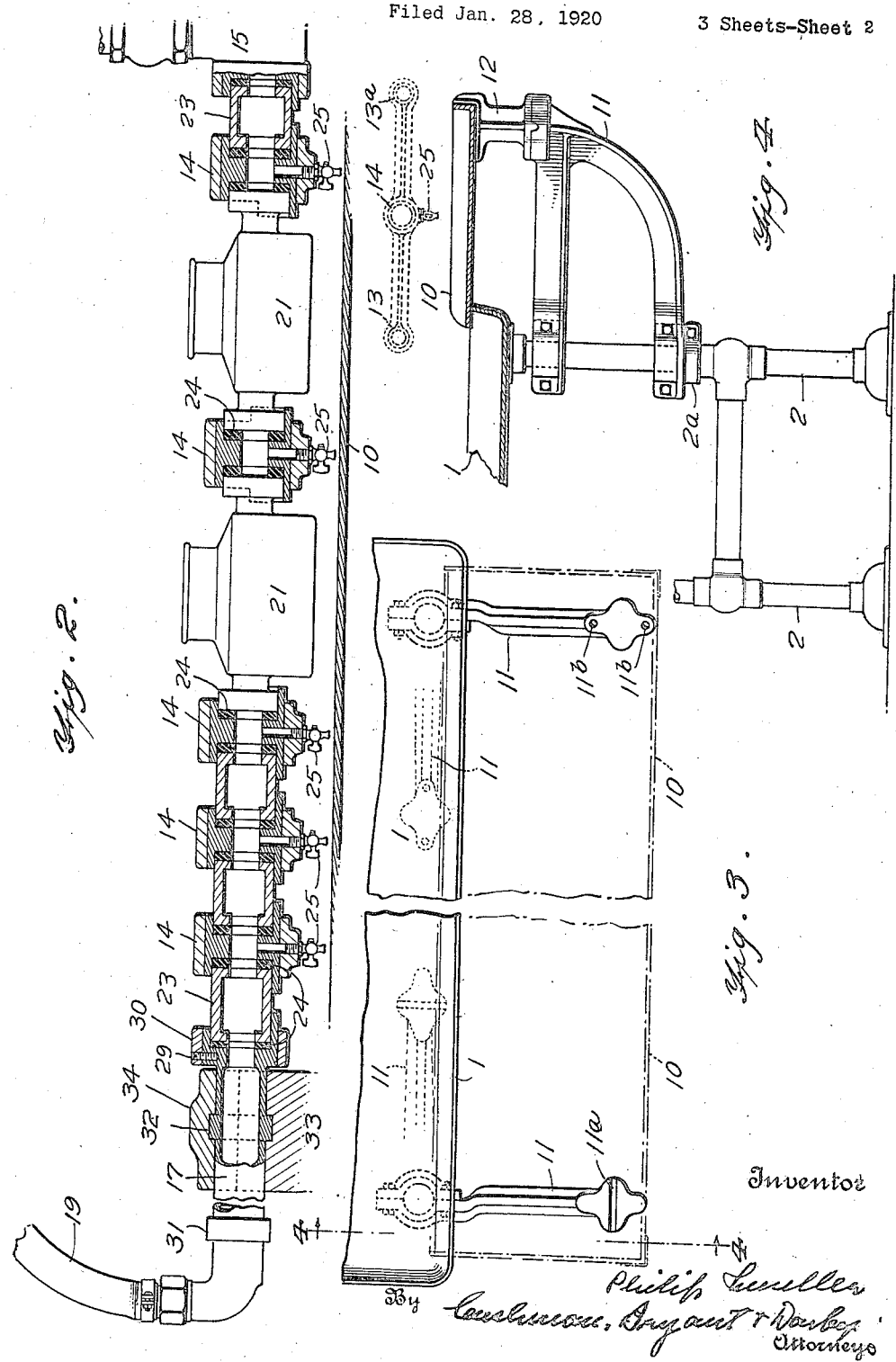

July 24, 1923.
P. MUELLER
MULTIPLE METER TESTER APPARATUS
Filed Jan. 28, 1920
1,462,718
3 Sheets-Sheet 3
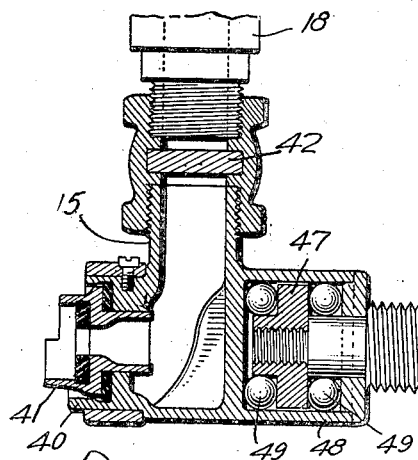
Fig. 5.
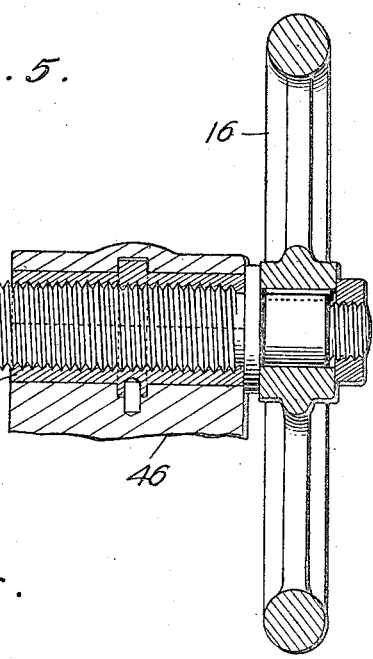
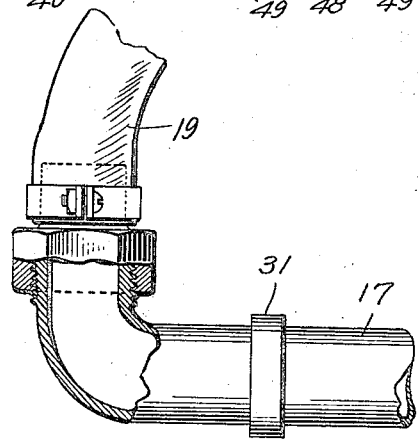
Fig. 6.
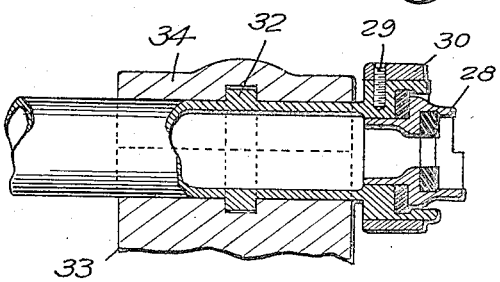
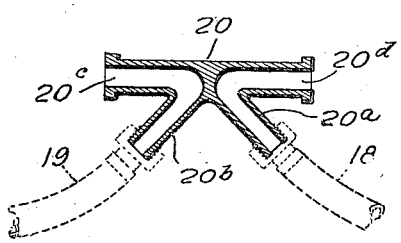
Fig. 8.
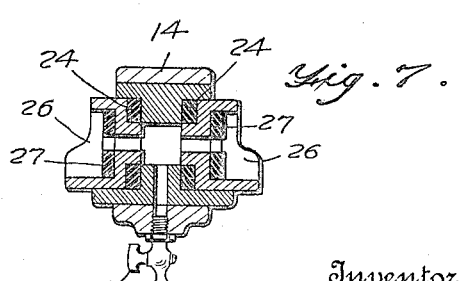
Fig. 7.
Inventor
Philip Mueller
By Cushman, Bryant & Darby
Attorneys Patented July 24, 1923.

1,462,718

UNITED STATES PATENT OFFICE.

PHILIP MUELLER, OF DECATUR, ILLINOIS, ASSIGNOR TO ADOLPH MUELLER, TRUSTEE, OF DECATUR, ILLINOIS.

MULTIPLE-METER-TESTER APPARATUS.

Application filed January 28, 1920. Serial No. 354,597.

*To all whom it may concern:*

Be it known that I, PHILIP MUELLER, a citizen of the United States, residing at Decatur, in the county of Macon and State of Illinois, have invented new and useful Improvements in Multiple-Meter-Tester Apparatus, of which the following is a specification.

The present invention relates to improvements in fluid meter testing machines and the particular object of the invention is to provide a machine or apparatus by which a plurality of meters may be simultaneously tested.

More specifically stated the present invention is an attachment for a meter tester of the type shown in Letters Patent 1,038,182 granted September 10, 1912, and in the accompanying drawing such an embodiment of the invention is illustrated.

Referring to the drawings:—

Fig. 1 is a perspective view of a meter testing apparatus constructed in accordance with the present invention.

Fig. 2 is a longitudinal sectional view, through the several coupling heads and fluid conduit connections shown in Fig. 1 on an enlarged scale, two meters being shown in testing position.

Fig. 3 is a detail plan view of a portion of the attachment.

Fig. 4 is a sectional view, substantially on the line 4—4 of Fig 3.

Fig. 5 is a detail sectional view of the connection between one of the fluid conduits and a meter connection and the means for adjusting the same.

Fig. 6 is a detail view of the other section of the fluid conduit and cooperating meter connection.

Fig. 7 is a detail sectional view of one of the meter connections.

Fig. 8 is a detail of the hose coupling.

Referring to the drawings the apparatus illustrated comprises a table-like supporting frame, including a top 1 and legs 2 which are connected by suitable rods. On the top 1 are arranged fluid supply and discharge heads 3, 4 relatively movable to and from each other and connected respectively with supply and discharge pipes each provided with a suitable valve for controlling the flow of fluid through said pipes and a meter which is supported between and connected with the heads 3, 4.

A support 5 for a meter to be tested is carried at the upper end of a threaded stem that rises from the top 1 and by adjusting said stem the support 5 can be readily positioned to properly sustain a meter so that the inlet and outlet thereof will be in proper relation to the fluid supply and discharge heads 3, 4.

The parts hereinbefore described are all included in the apparatus of said prior Patent 1,038,182 and the operation thereof will be readily understood.

While the apparatus of said patent, including the parts hereinbefore referred to, has been found very satisfactory for the purpose intended, it is only adapted for testing a single meter at a time and as it is evident that considerable time could be saved if a plurality of meters could be simultaneously tested the attachment hereinafter referred to has been provided.

10 designates a base plate or platform, one edge of which is shown as resting on the rim of the table 1 and the opposite edge of which is supported by brackets 11 which are mounted to turn about two of the legs 2 so that if it is desired to remove the attachment said brackets can be turned into the position shown in dotted lines in Fig. 3 in which they will be below the top 1 and entirely out of the way.

The brackets 11 are clamped about the legs 2, suitable collars $2^a$ being secured to said legs to prevent vertical displacement of the brackets; and means are provided whereby the base plate 10 will be interlocked with the brackets to prevent turning of the latter.

As shown in Fig. 4 the base plate or member 10 is provided at its outer edge, adjacent the ends thereof with depending members 12, the lower surfaces of which are provided with means for engaging the upper faces of the bracket arms 11 so that said plate and brackets will be rigidly connected. In the embodiment of the invention illustrated one of the brackets is provided with a groove $11^a$ and other with sockets $11^b$, the cooperating depending members 12 having on their lower faces a suitable rib and studs or pins adapted to respectively engage said groove and sockets. Any other suitable means of providing a rigid engagement between the bracket arms 11 and the plate 10 may be provided.

Mounted on the plate 10 are two parallel rods or bars, 13, 13ª, and fitted to said rods so as to be freely adjusted longitudinally thereto are a series of meter connections 14. The meter connection 14 at the right-hand end of the series, referring to Fig. 1, is connected with a fluid conduit coupling 15 and this in turn is connected with an adjusting screw extending through a suitable bearing on the base 10 and having at its free end a hand wheel 16. By turning this wheel the fluid conduit coupling and attached meter connection may be adjusted longitudinally of the rods 13, 13ª and the several connections caused to engage with the inlets and outlets of a plurality of meters, or interposed couplings, so that a continuous fluid conduit is provided as will be hereinafter explained more in detail. At the opposite end of the base 10 from the fluid conduit coupling 15 is arranged a second fluid conduit coupling head 17. The coupling heads 15 and 17 are respectively connected by flexible hose sections 18 and 19 with two of the arms 20ª, 20ᵇ of a connection member 20 that is mounted on the meter support 5 and provided with branches 20ᶜ, 20ᵈ that respectively connect with the adjacent supply and discharge heads 3, 4. This connection 20 is preferably of the form shown in Fig. 8 and is described in detail and claimed in Letters Patent No. 1,028,481 dated June 4, 1912.

In using the attachment the meters 21 to be tested are placed on the base 10 with the inlets and outlets thereof in alinement with the passages through the meter connections 14 and the hose coupling connections 15, 17. By adjusting the screw of the coupling 15 a fluid tight connection can be provided between the several meters and connecting heads. In case the number of meters to be tested is less than that of the spaces between the heads 14 and the connections 15, 17 suitable couplings 23 may be employed.

Each connecting head comprises a body having diametrically opposite projecting arms that loosely engage the supporting rods 13, 13ª. Gaskets 24 are arranged within each head 14 and each head is further provided with an outlet cock 25 by which fluid contained within the head may be drawn off when the flow of fluid through the apparatus is cut off.

In Figure 2 of the drawing there are illustrated but two meters. It will be understood however that the number of meters that may be simultaneously tested is limited only by the number that can be arranged between the several connections 14 and the hose couplings.

The number of connections 14 may be varied and it will be seen that a greater number of relatively small meters may be tested at the same time than of such large meters as are illustrated.

The openings in the opposite faces of the heads 14, about the gaskets 24, are of such size as to receive the inlet and outlet portions of meters of the largest size that are adapted to be tested by the apparatus. In case it is desired to test meters of smaller size adapters 26 (see Figure 7) may be employed. Each of these comprises a tubular body adapted to be seated closely against the gasket 24 and provided at its outer end with a seat and gasket 27 of less area against which the end of a meter to be tested can be closely forced.

A similar adapter 28 is provided at the free end of the hose coupling connector 17. Said end of this connector is secured by a screw 29 to a member 30 which has oppositely projecting arms sliding on the rods 13, 13ª. The connector 17 includes an elongated tubular body provided at one end with means for engagement with the hose and at its other end with a seat for the inlet end of a meter or the adaptor 28. Exteriorly said connector body is provided with two annular ribs 31, 32 which are adapted to be received in aligned grooves or recesses formed in a bearing 33 on the base plate 10 and a hinged cover member 34. A screw and nut connection 35 is provided for holding the member 34 in engagement with the coupling and the bearing 33. In case it is desired to adjust the hose coupling member longitudinally toward the other end of the base the clamp 35 is loosened and the cover member 34 lifted, the rib 32 of the coupling can then be disengaged from the bearing 33 and said coupling shifted to bring the rib 31 into engagement with said bearing, thus reducing the distance separating the coupling members 15, 17.

The coupling 15 comprises a body having at one end a seat 40 for a meter outlet or, as shown in Figure 5 for an adapter 41 and having at its outer end means for attachment to the hose 18. A suitable gate valve 42 adapted to be actuated by a handle 43 is arranged in said coupling. Said coupling also has laterally projecting arms 15ª that are provided with sleeves that embrace and are adapted to slide on the rods 13, 13ª. The screw 44 by which the coupling 15 is adjusted longitudinally of the base plate 10 extends through an internally threaded sleeve 45 secured against rotation on an upright 46 on the base plate and has on its inner end a head 47 that is arranged within a chamber in a boss 48 in the coupling 15. Antifriction balls 49 are interposed between said head 47 and the end walls of the chamber in which it is arranged. By turning the screw 44, by means of the hand wheel 16, the coupling 15 can be moved longitudinally of the base 10 and retained in any adjusted position.

After the meters to be tested have been properly assembled on the base 10 and pressure applied by the screw 44 to form a fluid tight conduit from the hose coupling member 17 to the similar member 15 the valves in the supply and discharge conduits are opened and fluid allowed to flow through the several meters. By means of a suitable differential valve mechanism, conventionally illustrated at 50, such as is customarily employed in connection with machines of the character of that herein referred to, the size of the stream flowing through the apparatus is regulated as desired and discharged into a suitable tank, not shown, in the ordinary manner.

It will be seen that the invention provides a very simple attachment for a meter testing machine by which a plurality of meters may be simultaneously tested. When it is not desired to test more than a single meter at a time the hose connection 20 may be quickly detached from the supply and discharge heads, the base plate 10 and parts supported thereby lifted from the brackets 11, and the latter turned to lie beneath the top 1.

While the invention has been described and in the accompanying drawings is illustrated as an attachment for the testing machine of Patent No. 1,038,182 it will be evident that many of the features thereof are applicable to machines differing in detail from that of said patent.

There may of course be considerable change in the details of the construction of the embodiment of the invention illustrated and described in the present case without departing from the spirit of the invention.

What I claim is new and desire to secure by Letters Patent is:—

1. In a fluid meter tester, the combination of a table, fluid supply and discharge heads supported by the table, a base supported at one side of the table, with one edge overhanging the top of the table, and adapted to support a plurality of meters, means on the base for establishing communication between the meters supported thereon, and conduits for connecting the end meters of the series on the base with the supply and discharge heads respectively.

2. In a fluid meter tester, the combination of a table, fluid supply and discharge heads rising from the table, brackets pivotally connected to the table to be turned to and from a position where they project laterally beyond one side of the table, a base adapted to rest on said brackets and extend partly over the table top, means for maintaining a series of meters on said base in communicating relation, and means for connecting the end meters of the series with the supply and discharge heads.

3. In a fluid meter tester, the combination of a table, fluid supply and discharge heads rising from the table, brackets extending laterally from the table, a base supported on said brackets and the table and adapted to support a plurality of meters, adjustable means on the base for maintaining the meters thereon in communicating relation, and conduits connecting the end meters of the series with the supply and discharge heads respectively.

4. In a fluid meter tester, the combination of a support including two parallel supporting rods, a plurality of meter connection heads mounted on and adjustable longitudinally of said rods, a fluid conduit coupling supported adjacent one end of said rods and bodily adjustable longitudinally thereof, means for securing said coupling against movement longitudinally of the supporting rods in any of a plurality of positions, a second fluid conduit adjacent the other end of the supporting rods, and means for adjusting the last said conduit and the meter connection heads longitudinally of the supporting rods.

5. In a fluid meter tester, the combination with a meter support, of a fluid conduit coupling including a tubular member provided with a plurality of annular ribs at intermediate points in its length and adapted to be connected to a meter, a bearing on the support having a recess adapted to receive either of the ribs on the coupling, and a clamp for holding the coupling from longitudinal movement relative to the bearing when either of said ribs is within said recess.

6. In a fluid meter testing machine, the combination of a support, two parallel rods extending longitudinally of said support, a plurality of meter connection heads having projections engaging said rods and adapted to be adjusted longitudinally thereof, two fluid conduit couplings mounted, respectively, adjacent the ends of the support and beyond the meter connection heads, each of said couplings having means for connection with a meter, and means for moving one of said couplings longitudinally of the support.

7. In a fluid meter testing machine, the combination of a support, fluid conduit couplings on the support adjacent the ends thereof, a plurality of meter connection heads on the support intermediate said couplings and adjustable longitudinally of the space between said couplings, tubular spaces adapted to connect adjacent connection heads, and means for moving one of the conduit couplings and said heads and spacers toward the other conduit coupling.

8. In a fluid meter testing machine, the combination of a support, a fluid conduit coupling adapted to be secured in either of a plurality of positions adjacent one end of said support and provided at one end with means for connection with an end of the fluid passage through a meter, a meter connection head adjustably mounted on the support and provided with means for connection with the fluid passages of two meters, a second fluid conduit adjacent the other end of the support having means for connection to the fluid passage of a meter, and means for adjusting the last said conduit and the meter connection head toward the other coupling and maintaining them in adjusted position.

In testimony whereof I have hereunto set my hand.

PHILIP MUELLER.